United States Patent [19]

Mieth et al.

[11] Patent Number: 5,048,555
[45] Date of Patent: Sep. 17, 1991

[54] PROCESS AND APPARATUS FOR PROTECTING AND SUPPORTING A SEAL OF A VALVE

[76] Inventors: Hans O. Mieth, Sandkrug 3, D-2058 Schnakenbek; Erich Schlotterbeck, Pflasterstrasse 4A, D-2053 Schwarzenbek, both of Fed. Rep. of Germany

[21] Appl. No.: 415,343
[22] PCT Filed: Jan. 17, 1989
[86] PCT No.: PCT/EP89/00044
§ 371 Date: Aug. 31, 1989
§ 102(e) Date: Aug. 31, 1989
[87] PCT Pub. No.: WO89/06763
PCT Pub. Date: Jul. 27, 1989

[30] Foreign Application Priority Data

Jan. 20, 1988 [DE] Fed. Rep. of Germany ....... 3801561
Jan. 20, 1988 [DE] Fed. Rep. of Germany ....... 3801569

[51] Int. Cl.⁵ .......................... F16K 3/24; F16K 25/00
[52] U.S. Cl. .................................... 137/238; 137/246; 251/318; 251/900
[58] Field of Search ............. 251/318, 900, 325; 137/238, 246

[56] References Cited

U.S. PATENT DOCUMENTS 2,469,921  5/1949  Hoge ............................. 251/900 X
2,583,539  1/1952  Bashark et al. ................ 137/625.37
3,776,260 12/1973  Ruddick ......................... 251/318 X
4,360,039 11/1982  Jeppsson ....................... 137/240 X
4,605,035  8/1986  Rasmussen et al. ............... 137/240
4,647,012  3/1987  Gartner .......................... 251/900 X

FOREIGN PATENT DOCUMENTS 1204043  8/1959  France ............................. 251/900
 668563  3/1952  United Kingdom .

Primary Examiner—Arnold Rosenthal
Attorney, Agent, or Firm—Lane, Aitken & McCann

[57] ABSTRACT

A process and a device are useful for protecting and supporting a seal in a valve arrangement. The device comprises a closure member designed as a slide gate having a translational or rotational movement, a seat region of the valve housing parts corresponding to said closure member, a closure part which can slide in the direction of the degree of freedom of the closure member, and a seal or sealing position which is effective between the closure member and the seat region or which co-operates with the closure part. Said process and device ensure, amongst others, that the seal in a valve arrangement of the type described in the introductory part is protected and supported in positions other than the closed position. To this end, the load on the seal or sealing position which ensures sealing in the closed position of the valve arrangement is applied by the closure part in positions other than the closed position.

11 Claims, 4 Drawing Sheets

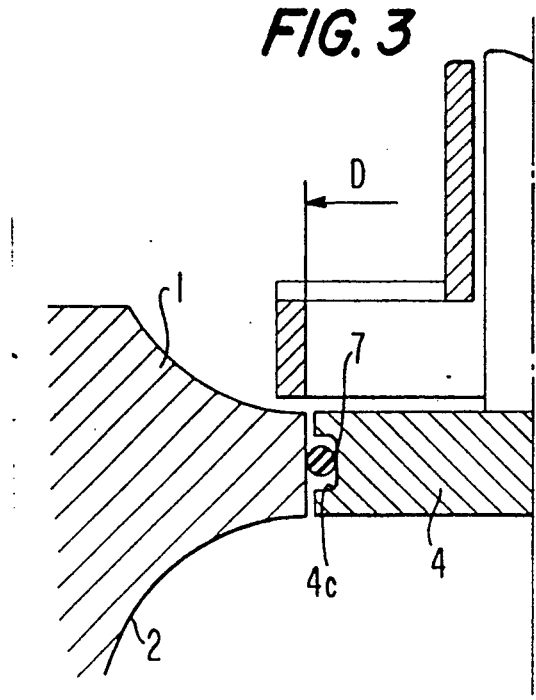
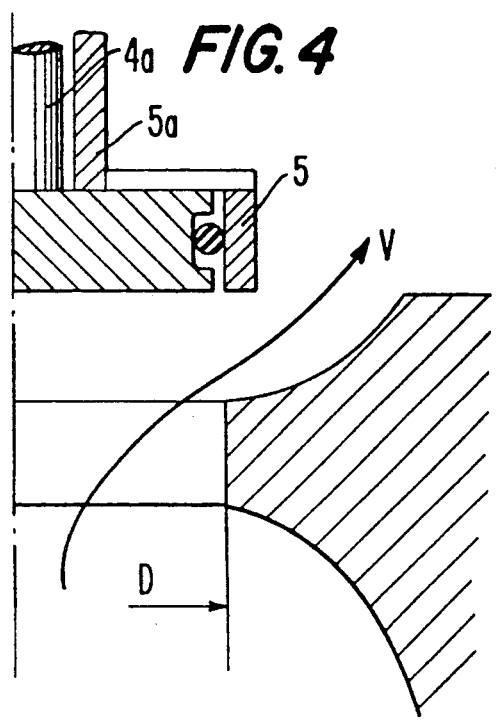
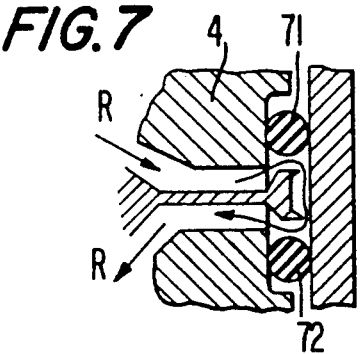
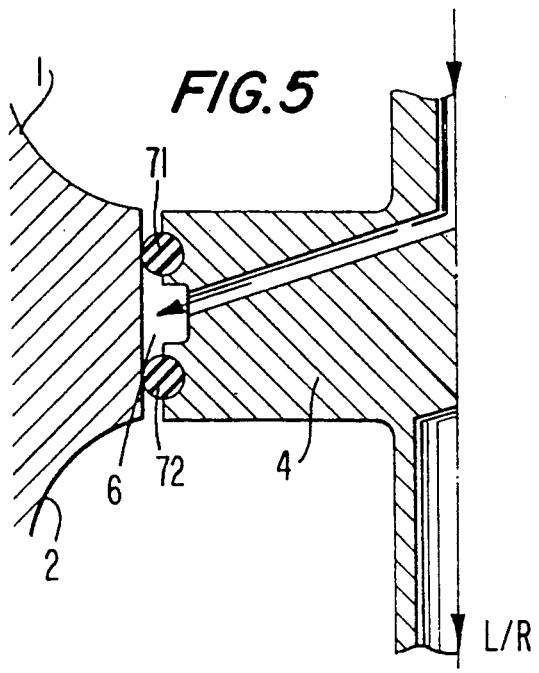
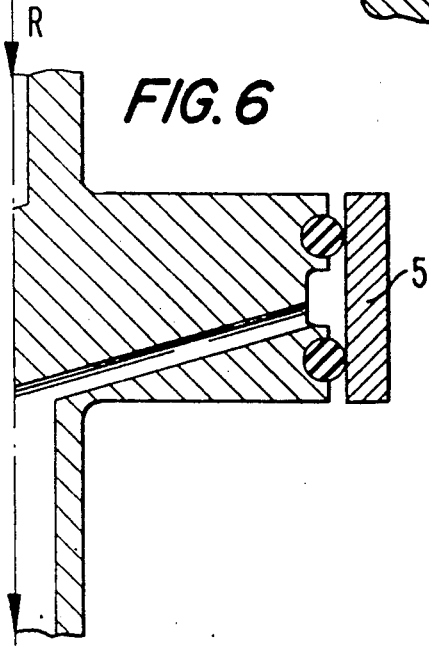

PROCESS AND APPARATUS FOR PROTECTING AND SUPPORTING A SEAL OF A VALVE

The invention relates to a process and an apparatus for protecting and for supporting a seal of a valve.

A valve of the initially identified group of the art is known from DE-A-37 01 027 and also from European Patent Application 0 279 177. The subject matters of the above mentioned patent applications according to the respective preambles of the main claims start out from a valve with a leakage cavity which is provided with two sealing places arranged in series to prevent in the closed position of the valve the overflow of fluids from one valve casing part into another. In the last mentioned patent application, the two sealing places inter alia are realized by means of a sealing arrangement comprising two separate seals arranged on the side of the valve casing, said two discrete seals inter alia being provided as seals with circular cross section. As far as the two known valves are concerned the leakage cavity is arranged between the sealing places and connected with the environment of the valve via the valve casing. These so-called double-seat valves, apart from the control of the medium inlet from the inner cavity of the valve to the leakage cavity known per se in connection with the closed position of the valve, solve the technical problem of controlling this inlet also in other positions of the valve. The solution of this technical problem is achieved in that the medium inlet from the inner cavity to the leakage cavity is controlled in positions other than the closed position of the valve by providing a substitute for the closing member to have the same effect as in the closed position with respect to its interaction with the leakage cavity. With a view to the actual realization of the object there is provided, among others, a locking element comprising an inner passage which is disposed in relatively mobile relationship to the closing member in the direction of the degree of its freedom of motion. Thereby the locking element, at least in the open position of the valve, is in permanent contact with the two sealing places or the two seals.

In each and every case of use, the known locking element is always in interaction with two seals or sealing places and, according to its purpose, it alone controls the medium inlet from the inner cavity to the leakage cavity between the two seals or sealing places.

As far as the known valves are concerned, the locking element takes over, in positions other than the closed position of the valve, the protection and the support of the two seals or sealing places, if these are realized by sealing means arranged on the side of the valve casing. For seals arranged on the side of the closing member, the known locking element in the proposed arrangement and its mode of operation do not provide any protection or support.

Starting out from the state of the art shown, it is the problem of the present invention to ensure, with a valve of the initially identified group of the art, protection and support of the seal in positions other than the closed position. It is now intended to mainly show solutions which protect and support, in particular, seals arranged on the side of the closing member.

The problem is solved by characterizing features. When applying the process of the invention to today's common valves these are provided with switching functions and properties which are novel and advantageous.

Advantageous embodiments of the valve for performing the above identified process are described.

One particular advantage achieved with the invention resides in the fact that the action principle known from DE-A-37 01 027 and EP-0 279 177 between a locking element and seals arranged on the side of the valve casing is consistently transferred and applied to valves of the most simple structure with a single on/off-function on the one hand and to complex valves with the most different switching functions and properties on the other hand. Thus, it was possible for the first time to dispose a seal with circular cross section, a so-called O-ring, with restricted mobility in a groove on the side of the valve casing, which seal though simple in structure constituted a not unproblematical sealing element particularly if disposed on the side of the valve casing, since also in the open position of the valve said seal was fixed by the locking element in a position equivalent to that in the closed position of the valve. This has the further effect that also in the open position of the valve, it is not exposed to the mechanical strain caused by the flow agent. In the known sealing arrangements, the seal disposed on the side of the casing is completely open to the inner cavity of the valve casing when the valve is in the open position. The seal is subjected, without any protection, to flow forces, corrosion and erosion of the flowing agent, at least on its surface facing the inner cavity of the valve casing.

Without specific measures the problem of loose sealing arrangements cannot be solved with the means known so far. However, e.g. in the USA, such loose sealing arrangements are coercive measures provided as standard solutions for biological and cleansing reasons, yet hitherto the problem was solved in a generally unsatisfactory manner there because the above described mechanical instability of the seal was accepted or the seal was reinforced or disposed in a cage. The present invention solves the problem existing in connection with the loosely arranged annular seal with relatively simple means.

However, the proposed invention also shows how the interaction principle, known from the above mentioned patent applications, between the locking element on the one hand and the valve casing, the two seals or sealing places and the leakage cavity on the other hand, is now analogously replaced by an interaction principle between the locking element on the one hand and the closing member, the seal(s) or the sealing places and optionally a leakage cavity on the other hand. Thereby, it is achieved on the one hand that the locking element protects and supports a seal or even two seals disposed on the side of the closing member in positions other than the closed position of the valve. If between the two seals disposed on the side of the closing member there is provided a leakage cavity, the medium inlet from the inner cavity to the leakage cavity will also be controlled in positions other than the closed position of the valve with the same effect as in the closed position by means of an arrangement substituting for the closing member with respect to its interaction with the leakage cavity.

The last-mentioned, newly created valve is also capable of solving all of the known problems as explained in detail in the above mentioned patent applications. There the most different procedures and features are indicated as solutions. They can be applied analogously and in an obvious manner to the newly created valve.

Since the principle of interaction between the locking element and closing member as proposed according to the invention results in an enveloping of the locking element by the closing member in the open position of the valve, the feature for the locking element to be gathered from the known valves, i.e. the mandatory so-called "inner passage", is not applicable. In the open position of the valve, the flowing agent now no longer flows through the locking element. This results in the advantage residing in the fact that the seat region with view to its passage cross section is no longer narrowed by the annular cross section of the locking element. A further advantage is to be seen in the fact that the locking element is conducted on or at the closing member with which, in the open position of the valve, it forms an embrace. It is true that in the known valve, the locking element is also run on or at the closing member, yet the formation of an embrace is completed with the seat region of the valve casing. In that regard, the means according to the invention results in less strict requirements concerning guiding quality and/or an aligning arrangement between the closing member axis and the valve casing.

Two seals disposed on the side of the closing member, between which there is provided a leakage cavity which is connected via conduits with the environment of the valve, can be cleaned with the agents known from the above identified patent applications, in both the closed position and the open position of the valve. The cleaning of a single seal, which is either disposed on the side of the valve casing or on the side of the closing member and which, according to the invention, is protected in all valve positions against the inner cavity of the valve casing, is provided according to an advantageous embodiment of the valve according to the invention in that the locking element is made to be permeable in the region where it overlaps the seal of the inner cavity of the valve casing in the direction of the seal. Since in this case the locking element need not assume a sealing function but is merely to protect and support the seal when positioned on the side of the casing in the open position of the valve, it may, for example, be provided with a plurality of openings.

By means of a further embodiment of the valve according to the invention, it is achieved that the single seal can be cleaned from the inner cavity of the valve casing part in that, in the direction of its switching mobility, the locking element is dimensioned such that there is a spatial connection between the inner cavity of the valve casing and the walls surrounding the seal. This dimensioning, which is necessary due to cleaning requirements, leads to a locking element of very flat structure.

With reference to the figures of the drawing briefly discussed in the following the substantial features of the subject matter of the application are shown as examples and described with respect to their mode of action. The following reference numerals and designations are used (see list):

List of designations
1,2: valve casing
1a: casing groove
3: seat region
4: closing member
4a: first bar
4b: outlet tube
4c: groove
5: locking element
5a: second bar
6: leakage cavity
6a: drain bore
7: seal
71: first seal
72: second seal
8: distribution and jet means
9: partition wall
10: feeding region
11: outlet region
12: cleaning tube
13: annular gap
14: casing seal
D: diameter of the seat region
L: leakage outlet/leakage
R: (feeding and/or outlet of cleansing agent) (cleansing agent)
$V_1$: passage flow FIG. 1 shows in simplified schematical representation a center section through a valve according to the invention comprising a seal disposed in the closing member, in the closed position and in the open position (left-hand side and right-hand side representation);

FIG. 3 and FIG. 4 show a center section through an embodiment according to FIG. 1 with a seal disposed with restricted mobility in the closed position and in the open position;

FIG. 5 and FIG. 6 show a center section through an embodiment according to FIG. 2 with a cleansing agent inlet to the leakage cavity in the closed position and the open position of the valve;

FIG. 7 shows an embodiment according to FIGS. 5 and 6 with modified cleansing agent inlet and outlet, respectively;

Figure 12:
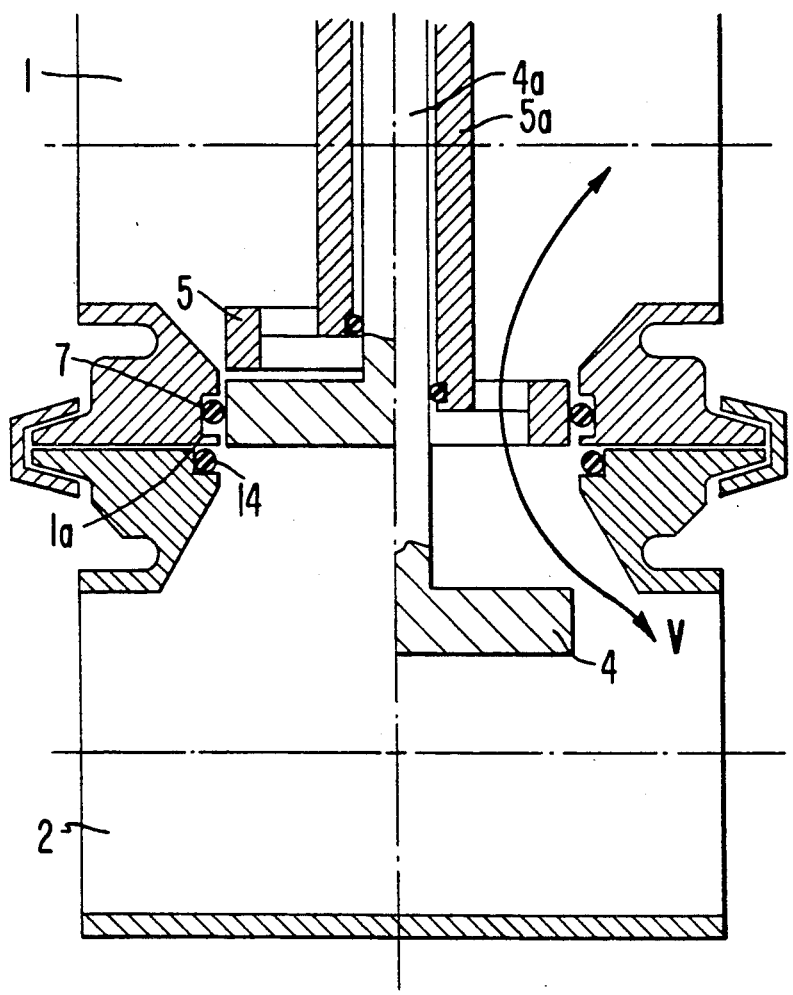

FIGS. 8 to 11 each show a center section through a valve according to FIGS. 5 and 6 with seals having restricted mobility and a differently constructed inlet for the cleansing agent and a differently constructed outlet for the cleansing agent or the leakage;

FIG. 12 shows a center section through another embodiment of the valve according to the invention, both in the closed position and in the open position, with a seal disposed on the side of the valve casing (left-hand side or right-hand side illustrations, respectively).

Figure 1:
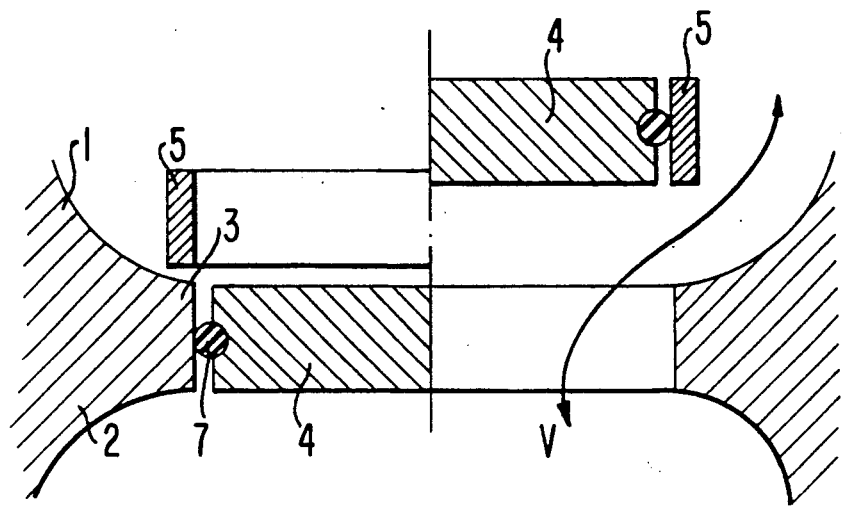

From FIG. 1 there is evident the above mentioned substitution principle of a locking element 5 and a seat region 3 of a valve casing 1, 2 with view to a closing member 4 and its seal 7. In the left-hand side representation, the closed position of the valve is shown, wherein a representation of the means for actuating closing member 4 and locking element 5 was dispensed with. Seat region 3 is in interaction with closing member 4 and its seal 7. In the open position of the valve (right-hand side representation), the action of seat region 3 with respect to seal 7 is substituted for by locking element 5. The strain on seal 7 produced in the closed position of the valve and causing a sealing effect is produced by locking element 5 in positions other than the closed position. In the open position of the valve, a passage flow V flows from valve casing part 1 to valve casing part 2 or vice versa. With view to the bore receiving closing member 4 locking, element 5 exhibits the same dimension D as the connection bore of valve casing parts 1, 2 in their seat region 3. The schematically shown valve is an inhibit valve with on/off-function.

Figure 2:
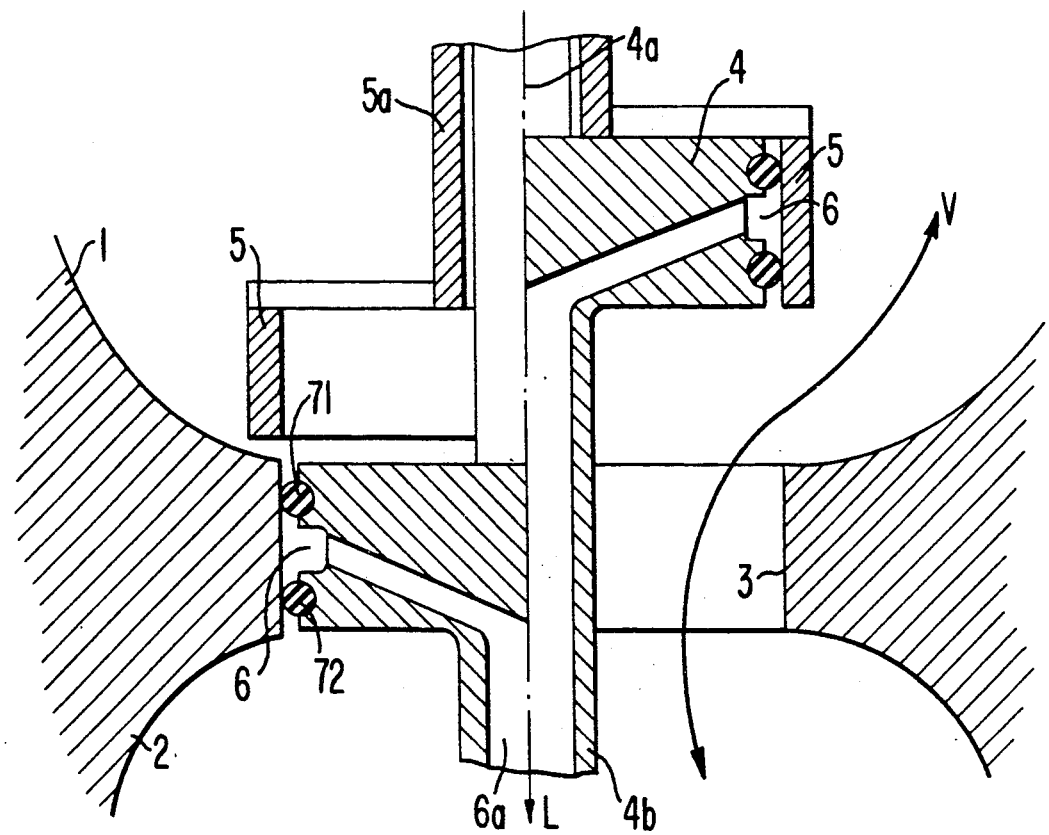
FIG. 2 shows a center section through another embodiment of the valve according to the invention comprising two seals disposed on the side of the closing member and a leakage cavity provided inbetween, also in the closed position and in the open position.
Figure 8:
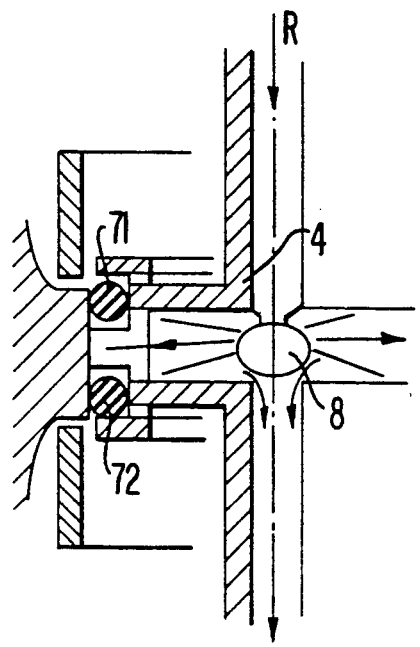

In the embodiment according to FIG. 2, closing member 4 is modified relative to FIG. 1, in that now two seals 71, 72 are provided, defining between them leakage cavity 6.

In the closed position of the valve, said leakage cavity 6 on the one hand is defined by valve casing part 1, 2, and on the other hand is connected with the environment of closing element 4 via a drain bore 6a provided within said closing member 4. There is known a number of solutions for arranging drain bore 6a within said closing member 4, e.g. drain bore 6a can be arranged in an outlet tube 4b, which is connected with closing member 4 and projects from valve casing part 2. The reversal thereof is also feasible, in that outlet tube 4b is arranged on the side of valve casing part 1 and extends therefrom to the environment of the valve. In the last mentioned case, drain bore 6a is then located in a first bar 4a by means of which closing member 4 is activated. Further embodiments of the valve with respect to the arrangement of drain bore 6a are shown also in FIGS. 8, 9, 10 and 11 (drain bore 6a in an outlet tube 4b emerging in downward direction). The right-hand side representation of FIG. 2 shows the leakproof valve in its open position. Now the outside of leakage cavity 6 is defined by the inner jacket surface of locking element 5. In both the closed and the open position of the valve, the leakage cavity 6 is closed against the inner cavity of valve casing parts 1 or 2. It can furthermore be recognized that with respect to seals 71 and 72 and with respect to leakage cavity 6, the locking element 5 substitutes for seat region 3 of valve casing parts 1 and 2. In seat region 3 there can be arranged, not shown in FIG. 2, a seat ring which is equally provided with the above mentioned functions on the side of the casing.

In contrast to the embodiment according to FIG. 1, there is provided in the embodiment according to FIGS. 3 and 4 a so-called "loose" seal 7 which is arranged within a groove 4c of closing member 4. Within groove 4c seal 7 has a restricted mobility in the direction of the switching movement of closing member 4, by which the cleanability of the critical areas between seal 7 and groove 4c is achieved. A prerequisite for the cleansing of said areas is, however, that locking element 5 is dimensioned such that there is a spatial connection between the inner cavity of valve casing parts 1, 2 and the walls surrounding seal 7. 4a and 5a designate the first bar and the second bar, respectively, for the actuation of closing member 4 and locking element 5, respectively.

In FIGS. 5, 6 and 7 a closing member 4 is shown which, in concurrence with the respective embodiment of the valve according to FIG. 2, is equipped with two seals 71 and 72, said seals defining between them leakage cavity 6. Said leakage cavity 6 is not only connected to the environment of the valve via a drain bore 6a, as shown in FIG. 2, but furthermore comprises a second connection path to the environment of the valve through which cleansing liquid can be introduced to leakage cavity 6. The above mentioned kind of leakage- and/or cleansing agent-discharge (in FIGS. 5 and 6 designated L/R) and the cleansing agent feed R can also be applied to a sealing arrangement according to the embodiment of FIG. 7 wherein the two seals 71 and 72 are arranged with restricted mobility in closing member 4. Solutions in this respect can be gathered from DE-A-37 01 027 and EP-0 279 177. FIGS. 8, 9, 10 and 11 furthermore show solutions how cleansing agent can be fed into leakage cavity 6 or is conducted thereto.

Closing member 4 can e.g. be a hollow body between seals 71 and 72 (FIG. 8), the cleansing liquid being fed via distribution and jet-spraying means 8 to the area of seals 71 and 72.

The area between seals 71 and 72 can also be divided by a partition wall 9 (FIG. 9), which forms a feed region 10 and an outlet region 11, so that the cleansing agent R is necessarily fed to the seal area and also discharged therefrom again.

Figure 10:
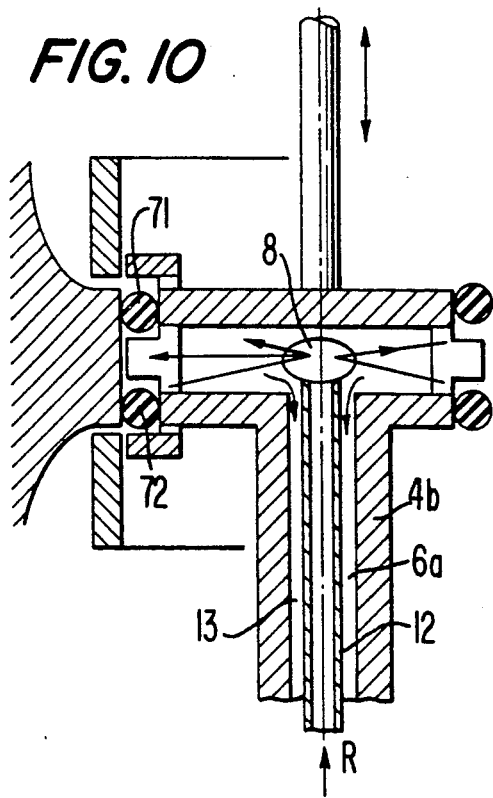

In the embodiment according to FIG. 10, a cleaning tube 12 with the distribution and jet-spraying means 8 is disposed in drain bore 6a of outlet tube 4b. Cleansing liquid R is fed to the sealing region and drained from there via an annular gap 13, formed between the inner wall of outlet tube 4b and cleaning tube 12.

Figure 9:
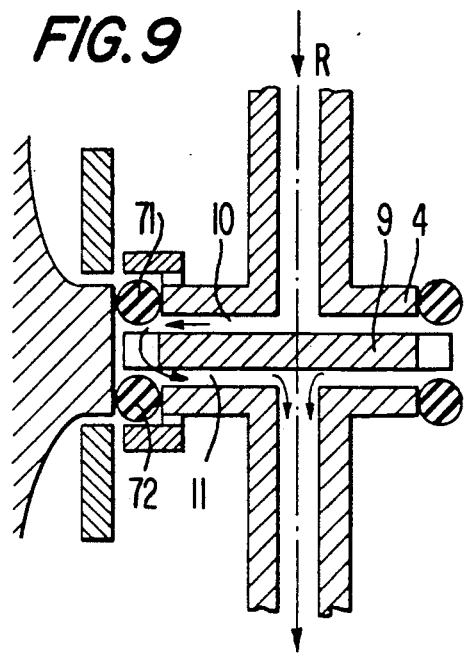
Figure 11:
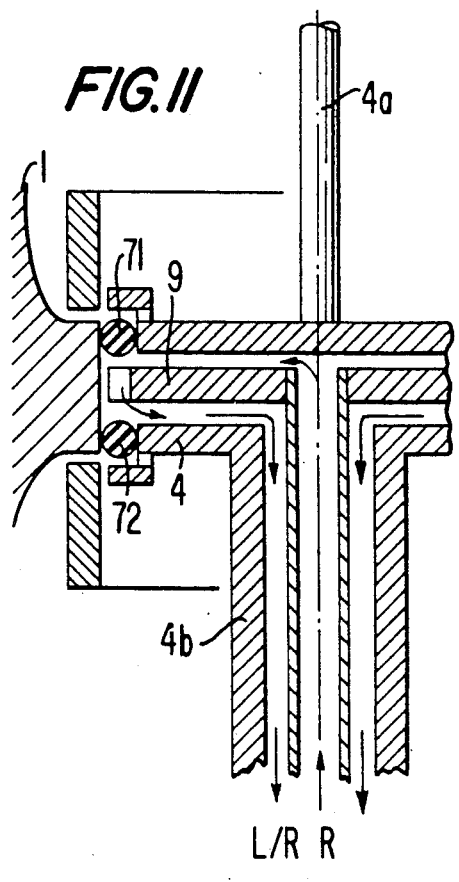

The structure of the embodiment according to FIG. 11 substantially corresponds to that of FIG. 9, the feed for cleansing liquid R and the drain for the leakage- and/or the cleansing fluid L/R being provided at one side of closing member 4. The drive of closing member 4 is either effected by bar 4a, which is provided on that side of closing member 4 which is opposite to outlet tube 4b, and extends from valve casing part 1 or, if the first bar 4a is omitted, via outlet tube 4b, the position of the mounted valve being shown in FIG. 11, or a mounted position displaced by 180° as compared to the shown assembly.

The embodiments of the valve according to the invention as shown in FIGS. 2 and 5 to 11 each involve a so-called leakage-free-switching double seat valve. If locking element 5 is fixedly connected by means of bridges with valve casing part 1 or 2, then there results a valve with which a leakage-restricted switching is possible. These connection bridges between locking element 5 and valve casing part 1 or 2 are to be provided with passage apertures which approximately correspond to the nominal cross section of the valve. Mode of action and function of this arrangement are known from the above mentioned patent applications. There exists a coercive analogy resulting from the manifold aspects and ways of consideration of the present problem.

FIG. 12 shows a valve according to the invention illustrating the action principle of the present invention of locking element 5 with view to seal 7 on the side of the casing, by means of the most simple switching function, the on/off-function. The representation on the left-hand side shows the closed position of the valve, that on the right-hand side the open position. In the closed position of the valve, seal 7, which is embedded in a casing groove 1a with free axial motion, is fixed in a manner known per se by means of closing element 4. For the sake of simplicity, casing seal 14 required between valve casing parts 1 and 2 was shown in a very simplified manner as far as its arrangement and embedding are concerned. The nature of the invention is evident from the open position of the valve (right-hand side representation), wherein locking element 5 has substituted in the position, with respect to seal 7, taken by the closing member 4 in the closed position. In none of the switching states shown, nor in the not shown intermediate states is, the so-called "loose" seal 7 exposed to the mechanical attack of the flow agent.

Seal 7 and casing groove 1a surrounding it become accessible to cleansing liquid in the open position of the valve if locking element 5 is made permeable from the inner cavity of valve casing 2 in the direction of seal 7 in the area of its overlapping with seal 7. For instance, locking element 5 can be provided with a large number of openings, so that, for instance, it has the shape of a cage. However, there can also be provided recesses passing through from the front side of locking element 5, which recesses make possible the access of cleansing fluid between the outer surface of locking element 5 and seal 7.

If locking element 5 is of very short length in the direction of its switching mobility, so that there is given a spatial connection between the inner cavity of valve casing 1, 2 and the walls surrounding seal 7, then there is possible in the open position of the valve an access of cleansing fluid from the inner cavity of valve casing 1, 2 to the sealing region in question.

We claim:

1. A valve comprising:
   a valve casing having a seat region;
   a closing member translatorily or rotatively displaceable between a closed position, in which fluid flow past said seat region is prevented, and an open position, in which fluid flow past said seat region is permitted;
   means mounted on said closing member in both said closed position and said open position for effecting a seal between said seat region and said closing member when the closing member is in said closed position, thereby preventing fluid flow past said seat region; and
   a locking element movable relative to said closing member, said locking element engaging said seal effecting means when said closing member is out of said closed position, whereby said locking element protects and supports said seal effecting means when said closing member is out of said closed position,
   wherein said means for effecting a seal comprises two seals spaced from one another to define a leakage cavity, and said valve further comprises means for placing said leakage cavity in fluid communication with the environment of the valve.

2. The valve according to claim 1, wherein said closing member is translatorily displaceable along a line, and said locking element is movable relative to said closing member along the same line.

3. The valve according to claim 1, further comprising means for feeding a cleansing agent to said leakage cavity, said feeding means comprising a conduit.

4. The valve according to claim 1, wherein said seals are mounted for restricted mobility on said closing member.

5. The valve according to claim 4, wherein said restricted mobility is in a direction parallel to the direction of displacement of said closing member between its closed position and its open position.

6. The valve according to claim 1, wherein said closing member is cylindrical and has an outer cylindrical surface, said seals are annular seals mounted on the outer cylindrical surface of said cylinder, and said locking element comprises a ring having an inner cylindrical surface engageable with said seals.

7. The valve according to claim 1, wherein said placing means comprises at least one conduit.

8. A valve comprising:
   a valve casing having a seat region;
   a closing member translatorily or rotatively displaceable between a closed position, in which fluid flow past said seat region is prevented, and an open position, in which fluid flow past said seat region is permitted;
   means mounted on one of said seat region and said closing member for effecting a seal between said seat region and said closing member when the closing member is in said closed position, said seal effecting means comprising two seals mounted for restricted mobility in a direction parallel to the displacement of said closing member between its closed position and its open position, said two seals being spaced apart to define a leakage cavity, and said closing member preventing fluid flow between said leakage cavity and other regions of the interior of the valve casing when the closing member is in its closed position;
   means for placing said leakage cavity in fluid communication with the environment of the valve; and
   means for preventing fluid flow between said leakage cavity and other regions of the interior of said valve casing when said closing member is out of said closed position, said preventing means comprising a locking element movable relative to said closing member, said locking element engaging said seals when said closing member is out of said closed position.

9. The valve according to claim 8, wherein said restricted mobility is in a direction parallel to the direction of displacement of said closing member between its closed position and its open position.

10. The valve according to claim 8, wherein said locking element defines means for permitting fluid to flow past said locking element to said seat region.

11. A method for operating a valve having
   a valve casing having a seat region;
   a closing member translatorily or rotatively displaceable between a closed position, in which fluid flow past said seat region is prevented, and an open position, in which fluid flow past said seat region is permitted;
   two seals on said closing member in both said closed position and said open position for effecting a seal between said seat region and said closing member when the closing member is in said closed position, thereby preventing fluid flow past said seat region, said two seals being spaced from one another to define a leakage cavity, said seals also preventing fluid flow between the leakage cavity and other regions of the interior of the valve casing;
   means for placing said leakage cavity in fluid communication with the environment of the valve; and
   a locking element movable relative to said closing member, said locking element engaging said seals when said closing member is out of said closed position, whereby said locking element protects and supports said seals when said closing member is out of said closed position, the method comprising:
   controlling fluid flow between the leakage cavity and other regions of the interior of the valve casing when said closing member is out of said closed position, said controlling step comprising moving said locking element into engagement with said two seals when said closing member is out of said closed position.

* * * * *